Nov. 24, 1936.   D. C. PRINCE   2,062,105
POWER SYSTEM
Original Filed Jan. 18, 1933
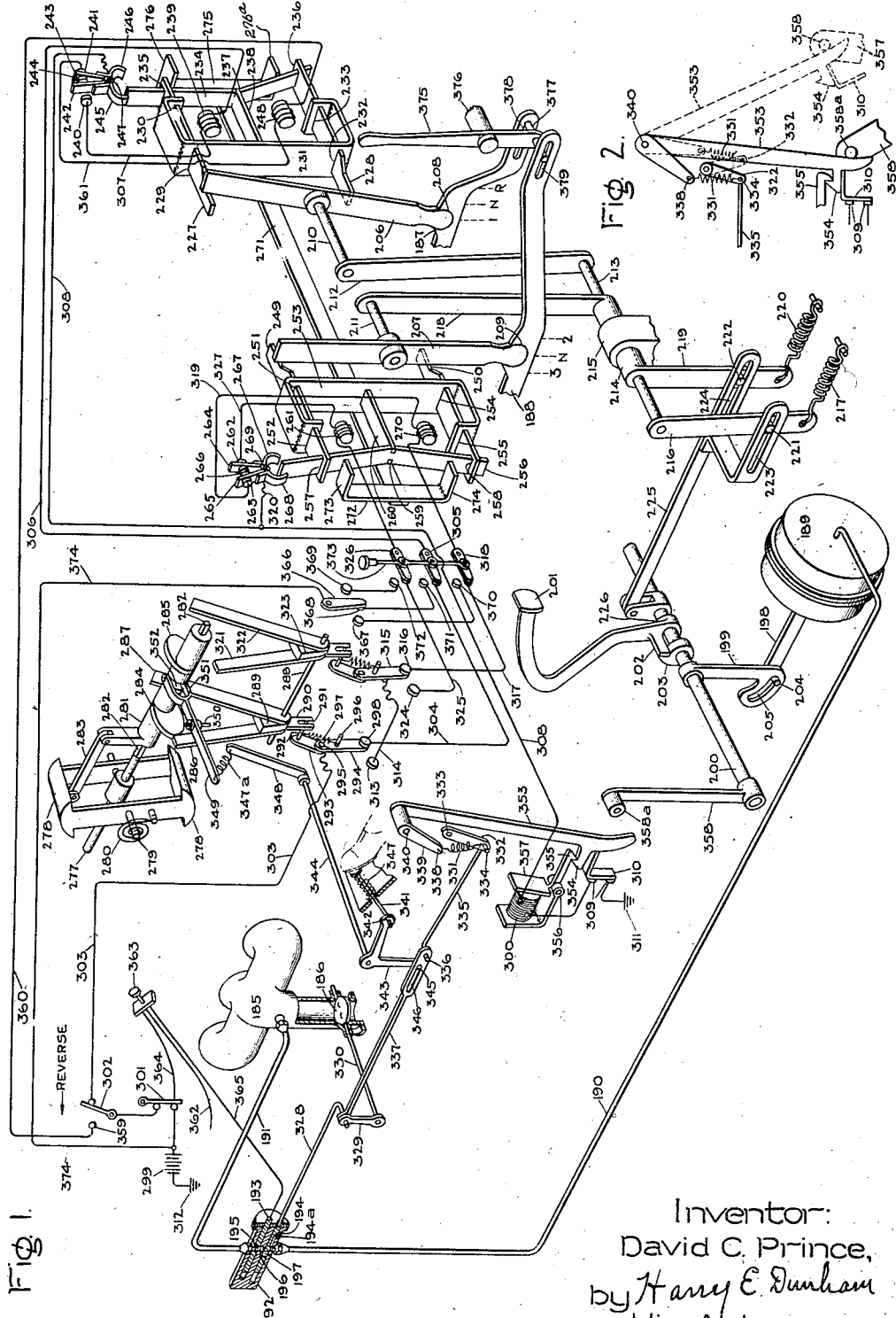
Inventor:
David C. Prince,
by Harry E. Dunham
His Attorney.

Patented Nov. 24, 1936

2,062,105

UNITED STATES PATENT OFFICE 2,062,105

POWER SYSTEM

David C. Prince, Swarthmore, Pa., assignor to General Electric Company, a corporation of New York Original application January 18, 1933, Serial No. 652,411. Divided and this application June 19, 1934, Serial No. 731,287

22 Claims. (Cl. 192—.01)

This is a division of my application Serial No. 652,411, filed January 18, 1933, and assigned to the General Electric Company, assignee of this invention.

My invention relates to a speed-changing mechanism which is particularly adapted to connect a prime mover to a load.

An object of my invention is to provide a speed-changing mechanism in which the shifting of the gears is controlled by stops arranged in the path of the operating mechanism.

Another object of my invention is to provide a speed-changing mechanism in which the movement of the clutch from the disengaged to the engaged position causes the gears to be shifted.

Further objects and advantages of my invention will become apparent as the following description proceeds, and the features of novelty which characterize my invention will be pointed out with particularity in the claims annexed to and forming a part of this specification.

Fig. 1 is a diagrammatic view of a power system for an automobile having a speed-changing mechanism embodying my invention, and Fig. 2 is a side elevation of the spring and lever arrangement which I employ for controlling the throttle and the speed-changing mechanism.

Referring to the drawing, I have illustrated the speed-changing mechanism embodying my invention as a part of a power system in which the gears of the speed-changing mechanism connecting the engine to the driving wheels of the vehicle are automatically shifted and in which electromagnets are utilized to change the relation of controlling stops so as to control shifting of the gears and in which the movement of the clutch from the disengaged to the engaged position effects the shifting of the gears. This has the advantage of minimizing the amount of power required to be supplied by the battery of the vehicle to automatically shift the gears of the speed-changing mechanism. This power system for an automobile includes an internal combustion engine provided with an intake manifold 185 through which the combustible mixture is supplied from a carburetor to the engine cylinders. The torque produced by the engine is controlled by the opening and closing of a throttle valve 186, which in its closed position permits a sufficient flow of combustible mixture to operate the engine at idling speed. The engine is connected to the driving wheels of the vehicle through a clutch and a speed changing, or gear shifting mechanism, having shifter bars 187 and 188 for moving the gears of the gear shifting mechanism to a neutral or gear engaging position. The clutch connecting the engine and the speed changing mechanism is biased in the usual way to a position in which the clutch is engaged, and a power device 189 is provided for engaging and disengaging the clutch.

This power system includes an electrically responsive gear shifting mechanism for actuating the shifter bars 187 and 188 from their neutral to their gear engaging positions, which is controlled by a centrifugal switch responsive to the speed of a driven member connecting the speed changing, or gear shifting mechanism, to the driving wheels of the vehicle. The particular speed of the driven member at which the electrically responsive gear shifting mechanism is actuated to shift the gears is modified by a spring, or other suitable arrangement, in accordance with the movement of the throttle controlling lever of the vehicle. In the interval during which the gears are shifted the throttle is automatically closed and the clutch disengaged, and after the gears are shifted the throttle is released, so that it can be opened and the clutch engaged. In this way the shifting of the gears of the vehicle is coordinated with the speed of the vehicle and the actuation of the throttle controlling lever in such manner as to produce maximum acceleration of the vehicle for any particular throttle opening, and obtain the most satisfactory performance of the vehicle, without any attention on the part of the operator.

The power device 189 is of the vacuum operated type, and is connected to the intake manifold 185 of the engine by pipes 190, 191, and a double valve 192 having plungers 193 and 194. When the vehicle is running under power and the gears automatically shifted, the plunger 193 is in the position shown in the drawing, in which an opening 195 is in alinement with the opening 196 through the double valve. The plunger 194 is provided with an opening 197 shown projected out of alinement with the openings 195 and 196 to close the valve, which can be brought into alinement with these openings to open the valve by retracting the plunger 194. The plunger 194 is also provided with a slot 194a which vents the power device 189 to engage the clutch when the plunger is projected. In the projected position of the plunger 194, shown in the drawing, the power device is vented and the valve 192 cuts off communication between the intake manifold 185 and the power device 189, which engages the clutch. When the plunger 194 is retracted the valve 192 is opened, which affords communication between the intake manifold 185 and the power device 189, and the vent 194a is closed, which disengages the clutch. Opening the valve 192 actuates the power device 189 to disengage the clutch through a linkage including the link 198 and an arm 199 attached to a shaft 200, which is mounted on suitable bearings, and which is connected to the clutch controlling arm. A foot pedal 201 is loosely mounted on the shaft 200, and provided with a projection 202, which engages a collar 203 fixed on the shaft 200, so that upon depressing the foot pedal 201 the clutch can be disengaged independently of the power device 189. The foot pedal can be actuated independently of the power device 189, as the link 198 is connected to the arm 199 by a pin 204 extending into a slot 205 in the arm.

The shifter bars 187 and 188 are actuated by a gear shifting mechanism, which is electrically controlled, so as to move both of the shifter bars to a gear engaging position, the electrical controlling coils of the gear shifting mechanism being arranged so that they are deenergized as soon as they are actuated. The power for shifting the gears is obtained from the power device 189. This gear shifting mechanism includes levers 206 and 207, which are pivotally connected at 208 and 209 to the shifter bars 187 and 188 respectively. The levers 206 and 207 are pivotally connected intermediate the ends thereof to shafts 210 and 211 respectively. The shaft 210 is secured to an arm 212, which is attached to one end of a shaft 213 extending through a sleeve 214 mounted in a bearing 215. The other end of the shaft 213 is attached to a downwardly depending arm 216, which is connected at its lower end to a tension spring 217. The shaft 211 is connected to an arm 218, which is attached to one end of the sleeve 214. The other end of the sleeve 214 is provided with a downwardly depending arm 219 having a tension spring 220 connected to the lower end thereof. The arms 216 and 219 are connected to the power device 189 by pins 221 and 222 extending into slots 223 and 224 in a forked link 225 connected to an arm 226 attached to the shaft 200. These slots are arranged so that upon reciprocation of the forked link 225 the pins 221 and 222 come to the end of their range of movement to actuate the shifter bars 187 and 188, and in subsequent further movement of the link 225 to the position shown in the drawing the clutch is engaged. By this arrangement, whenever the power device 189 is actuated to disengage the clutch, the forked link 225 moves the arms 216 and 219 against the action of the tension springs 217 and 220. When the power device is actuated to engage the clutch the forked link 225 permits the springs 217 and 220 to return the arms 216 and 219 toward their initial positions. This movement of the arms 216 and 219 produced by the disengagement and engagement of the clutch reciprocates the shafts 210 and 211 through the shaft 213, sleeve 214, and arms 212 and 218.

In order to utilize the reciprocatory movement of the shafts 210 and 211, which are pivotally connected to the levers 206 and 207, first to move the shifter bars 187 and 188 to a neutral position, and then to move one of them to a gear engaging position, I arrange stops on opposite sides of the reciprocating pivotal connections in the path of reciprocatory movement of both levers 206 and 207, the stops being retractable out of the path of movement of the levers to obtain the desired actuation of the shifter bars. In the particular construction illustrated, stops 227 and 228 are supported for sliding axial movement parallel to the axis of the shaft 210, and are arranged on opposite sides of the pivotal connection between the lever 206 and the shaft 210. The stop 227 is slidably supported in the openings 229 and 230 in the upper portion of a C-shaped bracket 231, which is rigidly supported on a suitable framework. The stop 228 is also slidably supported in openings 232 and 233 in the lower portion of the C-shaped bracket. The stops 227 and 228 are interconnected by a rocking bar 234 extending through openings 235 and 236 in the ends of the stops, and pivotally supported intermediate the ends thereof on a bar 238 secured to the C-shaped bracket 231. It will be noted, that when the stop 227 is projected in the path of reciprocatory movement of the lever 206, as shown in the drawing, the stop 228 will be retracted by the rocking bar 234 out of the path of movement of the lever 206. The stop 227 is arranged in such relation to the upper end of the lever 206 that reciprocation of the shaft 210, produced by disengagement and engagement of the clutch, will move the shifter bar 187 into its first speed position 1. The relation of the linkage connecting the shaft 210 with the power device 189 is such that the arm 206 moves the shifter bar 187 into its first speed position 1 before the clutch is engaged. In the mid-position of the rocking bar 234 the stops 227 and 228 are projected an equal distance from the C-shaped bracket 231, and both of them will be in the path of reciprocatory movement of the lever 206, so that reciprocation of the shaft 210 produced by oscillation of shaft 200 during disengagement and prior to reengagement of the clutch will first cause the lower portion of the lever 206 to engage the stop 228 and move the shifter bar from its first speed position 1 to its neutral position N, and when the shifter bar reaches its neutral position the upper end of the lever 206 will engage the stop 227, so as to retain the shifter bar 187 in its neutral position. In the other extreme position of the rocking bar 234 the stop 228 will be projected into the path of movement of the lever 206, and the stop 227 will be retracted out of the path of movement of the lever 206, so that reciprocatory movement of the shaft 210 will cause the lever 206 to engage the stop 228 and move the shifter bar 187 from its first speed position 1, or its neutral position N, to the reverse position R, during which movement the upper end of the lever 206 will swing past the retracted end of the stop 227.

The stops 227 and 228 are preferably actuated electrically to obtain the desired movement of the shifter bar 187 to its first speed position 1, or to its reverse position, and the circuits of this electrical control are arranged to be deenergized upon actuating the stops. The stop 227 is projected into the path of movement of the lever 206, and the stop 228 is retracted out of the path of movement thereof, to obtain movement of the shifter bar 187 to its first speed position, by an actuating coil 239, which is supported within the C-shaped bracket 231, and which is connected to the controlling circuits through a double switch. This double switch has fixed contacts 240 and 241 and movable contacts 242 and 243, which are urged into engagement with the fixed contacts by a spring 244. The movable contact 242 is carried by an operating arm 245, and the movable contact 243 is carried by an operating arm 246, both of these arms being pivotally supported at 247. The operating arm 245 is arranged to be engaged by the upper end of the rocking bar 234 toward the end of its range of movement, so as to open the contacts 240 and 242, which deenergize the actuating coil 239, as it is connected to the controlling circuits through these contacts.

The rocking bar 234 is moved to the other end of its range of rocking movement by an actuating coil 248, to retract the stop 227 out of the path of movement of the lever 206 and to project the stop 228 into the path of movement of the lever, and thereby actuate the shifter bar 187 into its reverse position R. The actuating coil 248 is supported in the C-shaped bracket 231, and connected to the controlling circuits through the stationary contact 241 and movable contact 243 of the double switch. The operating arm 246 is pivotally supported at 247 near the end of the path of movement of the upper end of the rocking bar 234 produced by the actuating coil 248 so that the operating arm is engaged by the rocking bar to open contacts 241 and 243 and deenergize the actuating coil 248.

The shifter bar 188 is retained in its neutral position, moved from its neutral position to either of its gear engaging positions, or moved from one of its gear engaging positions to another, in response to reciprocation of the shaft 211, by cooperating stops 249 and 250, which extend parallel to the shaft 211, and which are retractably arranged in the path of movement of the lever 207 on opposite sides of the shaft 211. The stops 249 and 250 are arranged in such relation to the lever 207 that upon reciprocation of the shafts 210 and 211 produced by disengagement and engagement of the clutch, the lever 207 engages the stops 249 and 250, in their position illustrated in the drawing, to retain the shifter bar 188 in its neutral position simultaneously with the movement of the shifter bar 187 to its neutral position, after which further actuation of the lever 206 will move the shifter bar 187 to its first speed position by the lever 206 engaging the stop 227 and swinging past the stop 228, this movement of the shifter bar 187 to its first speed position occurring before the engagement of the clutch. Similarly, when the shifter bar 187 is moved into its reverse position R upon reciprocation of the shafts 210 and 211, the shifter bar 188 will be retained in its neutral position by engagement with the stops 249 and 250 and the shifter bar 187 will first move to its neutral position by engagement with the stop 228 and, upon further movement of the arm 206, will swing past the retracted end of the stop 227 and move the shifter bar 187 into its reverse position.

The stop 249 is slidably supported in openings 251 and 252 in the upper end of a C-shaped bracket 253, and the stop 250 is slidably supported in openings 254 and 255 in the lower end of this C-shaped bracket. The C-shaped bracket is also rigidly supported on a suitable framework. The stops 249 and 250 are interconnected at the ends thereof by a rocking bar 256 extending through openings 257 and 258 in the ends of the stops. This rocking bar is pivotally supported intermediate the ends thereof at 259 on a bar 260 attached to the C-shaped bracket 253. By this arrangement, when the stop 249 is further projected in the path of movement of the lever 207, the stop 250 is retracted out of the path of movement of the lever 207, so as to move the shifter bar 188 into its third speed position. Similarly, when the stop 250 is further projected in the path of movement of the lever 207, the stop 249 is retracted out of the path of movement thereof, so that the lever 207 will move past the end of the stop 249 and move the shifter bar 188 to its second speed position.

The stops 249 and 250 are electrically actuated and the circuit is arranged to be deenergized after the stops are moved to the desired position. The stop 249 is further projected in the path of movement of the lever 207, and the stop 250 is retracted out of the path of movement thereof, to move the shifter bar 188 from its second speed or neutral position to its third speed position, by an actuating coil 261, which is connected to the control circuits through a double switch. This double switch has stationary contacts 262 and 263, and movable contacts 264 and 265, which are urged into engagement with the stationary contacts by a spring 266. The movable contacts 264 and 265 are carried by operating arms 267 and 268, which are pivotally supported at 269. The operating arm 267 is arranged to be engaged by the upper end of the rocking bar 256 toward the end of its range of movement produced by the actuating coil 261, so as to open the contacts 262 and 264 and deenergize the actuating coil 261, which is connected to the control circuits through these contacts. The stop 250 is further projected into the path of movement of the lever 207 and the stop 249 is retracted out of the path of movement of the lever 207, so as to move the shifter bar 188 from its neutral position or third speed position, to its second speed position by an actuating coil 270, which is supported in the C-shaped bracket 253. Near the end of the range of movement of the rocking bar 256, produced by the actuating coil 270, the upper end of the rocking bar engages the operating arm 268 of the double switch, so as to open the contacts 263 and 265 and deenergize the actuating coil 270, which is connected to the control circuit through these contacts.

In order to prevent both of the shifter bars 187 and 188 being moved to a gear engaging position at the same time, I mechanically interlock the rocking bars 234 and 256, so that whenever one of the stops connected to these rocking bars is projected into the path of movement of the adjacent reciprocating lever, the stops connected to the other rocking bar will both be retained in the path of movement of the cooperating reciprocating lever, so that one of the shifter bars will be moved to its gear engaging position, and the other will be retained in its neutral position. This mechanical interlock includes an interlocking bar 271 slidably supported on the C-shaped brackets 231 and 253 in alinement with the supporting bars 238 and 260. One end of the interlocking bar 271 is provided with a U-shaped cross-bar 272 extending parallel to the main body of the C-shaped bracket 253 and having inturned ends 273 and 274, which in the position shown in the drawing, engage the rocking bar 256 on opposite sides of the pivotal support 259 and equidistant therefrom, so as to retain the rocking bar in its mid-position with the stops 249 and 250 both in the path of reciprocatory movement of the lever 207, which retains or moves the shifter bar 188 to its neutral position N in response to reciprocation of the shaft 211. The other end of the interlocking bar 271 is provided with a U-shaped cross-bar 275 extending parallel to the body of the C-shaped bracket 231 and having inturned ends 276 and 276a extending across the rocking bar 234 and arranged equidistant from its pivotal support 237. The distance between the crossbars 272 and 275 is such, that when the rocking bar 234 projects the stop 227 and retracts the stop 228, as shown in the drawing, the lower end of the rocking bar will engage the arm 276a and move the interlocking bar 271 to the right, so as to bring both ends 273 and 274 of the crossbar 272 into engagement with the rocking bar 256 and retain the rocking bar 256 in its mid-position and project both of the stops 249 and 250 in the path of movement of the lever 207. Similarly, when the rocking bar 234 is moved to project the stop 228 in the path of movement of the lever 206 and retract the stop 227 out of the path of movement of this lever, the other end of the rocking bar will engage the arm 276 of the cross-bar and also retain the rocking bar 256 in its mid-position shown in the drawing. Whenever the rocking bar 256 is moved from its mid-position to project one of the stops 249 or 250 connected thereto further in the path of movement of the lever 207, and to retract the other stop out of the path of movement of this lever, so as to move the shifter bar 188 into its second or third speed position in response to reciprocation of the shaft 211, the arms 276 and 276a connected to the interlocking bar will move the rocking bar 234 to its mid-position and retain both of the stops 227 and 228 in the path of movement of the lever 206, which retains or moves the shifter bar 187 into its neutral position.

The actuation of shifter bars 187 and 188 of the gear shifting mechanism, as above described, is initiated in accordance with the speed of the vehicle, and the opening of the throttle 186, so as to coordinate the shifting of gears with the tractive effort and speed of the vehicle prior to the initiation of the gear shifting operation. I do this by providing switches, which are actuated by a centrifugal device responsive to the speed of the vehicle, and modified in its action by the opening of the throttle when the gear shifting operation is initiated.

This centrifugal device includes a shaft 277, which is driven by the connection between the speed changing mechanism and the driving wheels, so that it is driven at a speed which is directly proportional to the speed of the vehicle. Weights 278 are pivotally mounted on a shaft 279 secured to the shaft 277 at right angles thereto, and the weights 278 are retained in a position inclined to the axis of the shaft 277, as shown in the drawing, by a spring 280. As the speed of the shaft 277 increases, the weights 278 are centrifugally actuated, so that they move toward a plane at right angles to the shaft 277, and correspondingly move a sleeve 281 having a square axial opening fitted on the square portion 282 of the shaft and connected to the weights 278 by a link 283. The sleeve 281 is, therefore, moved toward the end of the shaft 282, as the speed of rotation of the weights 278 increases. The sleeve 281 is provided with axially spaced cams 284 and 285, and when the vehicle is operating at low speed with the various elements of the system in the relation shown in the drawing, or at standstill, the cam 284 engages an arm 286 of a first toggle switch. This toggle switch includes another arm 287, and the arms 286 and 287 are spaced apart by a block 289 and pivotally mounted on a shaft 288 extending parallel to the axis of the shaft 277. The arms 286 and 287 are provided with a lower extension 290 having a slot 291 in the end thereof engaging a pin 292 carried by the toggle mechanism of the switch. This toggle includes arms 293 and 294, which are pivotally mounted at 295, the lower arm being provided with a pin 296, and a spring 297 is connected between the pins 292 and 296, so as to move the arm 294 and the toggle switch into engagement with a fixed contact 298 in response to moving the arm 286 to the position shown in the drawing. Bringing the contact 294 into engagement with the contact 298 closes the circuit between a battery 299 and the actuating coil 239 of the electrically responsive gear-shifting mechanism and a throttle closing coil 300 by a circuit including switch 301, switch 302, conductor 303, arm 294 of the first toggle switch, contact 298, conductor 304, contact 305 of a switch, conductor 306 to actuating coil 239, conductor 307, contacts 240 and 242 which are then closed, conductor 308 to the throttle closing coil 300, through fixed contacts 309 of a switch bridged by a movable contact 310 to ground at 311, which completes the circuit to the battery 299 as one side thereof is grounded at 312.

Closing the circuit through the actuating coil 239 moves the rocking bar 234 into the position shown in the drawing, so as to project the stop 227 further into the path of movement of the lever 206, and to retract the stop 228 out of the path of movement of this lever. Reciprocation of the shafts 210 and 211, which is produced by the connecting links and springs upon disengagement and engagement of the clutch, will then move the shifter bar 187 into its first speed position 1. The actuating coil 239 will be de-energized in moving the rocking bar 234 to this position, as it opens the contacts 240 and 242 of the double switch.

Further increase of speed of the vehicle causes the weights 278 to move the cam 284 axially toward the end of the shaft 282 and bring this cam into engagement with the arm 287 of the first toggle switch, swinging the arm 294 out of engagement with the fixed contact 298 and into engagement with the fixed contact 313. This completes the circuit between the battery 299 and the actuating coil 270 and the throttle closing coil 300 by a circuit including switch 301, switch 302, conductor 303, arm 294, contact 313, conductor 314, arm 315 of the second toggle switch, fixed contact 316 of the second toggle switch, conductor 317, a switch contact 318 to the actuating coil 270, conductor 319, contacts 263 and 265 of the double switch, conductor 320, conductor 308 to the throttle closing coil 300, and contacts 309 and 310 of a switch to ground at 311.

Closing the circuit through the actuating coil 270 moves the rocking bar 256 so as to project the stop 250 further into the path of movement of lever 207 and to retract the stop 249 out of the path of the movement of this lever. The movement of the rocking bar 256 causes the upper end 273 of the cross bar 272 to move the interlocking bar 271 to the left so as to bring both ends 276 and 276a of the cross-bar 275 into engagement with the rocking bar 234. This retains the rocking bar 234 in its mid-position and projects both of the stops 227 and 228 into the path of the movement of the lever 206. Reciprocation of the shafts 210 and 211 which is produced by the connecting links and springs upon disengagement and engagement of the clutch will then move the shifter bar 187 into its neutral position N and move the shifter bar 188 into its second speed position 2. The actuating coil 270 will be deenergized in moving the rocking bar 256 to this position by the opening of contacts 263 and 265.

Upon further increase in speed of the vehicle the cam 285 will be moved by the weights 278 past the arm 321 of the second toggle switch, which is the same distance from the axis of the shaft as the arm 286, in the positions illustrated in the drawing, and will then engage the arm 322 of the second toggle switch. The arms 321 and 322 are both pivotally mounted on the shaft 288 and spaced apart by a block 323, the remainder of the switch structure being the same as the first toggle switch, so that when the cam 285 engages the arm 322 the arm 315 of the second toggle switch is moved out of engagement with the fixed contact 316 and into engagement with the fixed contact 324. The engagement of the arm 315 with the fixed contact 324 will then close a circuit between the battery 299 and the actuating coil 261. This circuit includes switch 301, switch 302, conductor 303, arm 294 of the first toggle switch, fixed contact 313 of the first toggle switch, conductor 314, arm 315, fixed contact 324 of the second toggle switch, conductor 325, arm 326 of a switch to the actuating coil 261, conductor 327, contacts 262 and 264 of the double switch associated with the rocking bar 256, conductor 320, conductor 308 to the throttle closing coil 300, and contacts 309 and 310 to ground at 311. Energizing the actuating coil 261 in this way will swing the rocking bar 256, so as to project the stop 249 into the path of movement of the lever 207, and retract the stop 250 out of the path of movement thereof, so that upon reciprocation of the lever 207 produced by the disengagement and engagement of the clutch the arm 207 will engage the stop 249 and move past the end of the stop 250 to move the shifter arm 188 from its second speed position 2 into its third speed position 3.

The swinging of the rocking bar 256 to project the stop 249 in this way will cause the other end of the rocking bar to engage the arm 274 carried by the interlocking bar and hold the arms 276 and 276a carried by the other end of the interlocking bar in engagement with rocking bar 234, so as to retain it in its mid-position and hold both of the stops 227 and 228 in the path of movement of the lever 206. Reciprocation of the lever 206 then cannot move the shifter bar 187 from its neutral position. The movement of the rocking bar 256 to project the stop 249 will deenergize the actuating coil 261, as the upper end of the rocking bar engages the operating arm 267, which opens the contacts 262 and 264 of the double switch.

In order to disengage and engage the clutch connecting the engine to the speed-changing mechanism so that the gears will be shifted automatically during the interval in which the clutch is disengaged, and so that the throttle 186 will be closed to cause the engine to run at idling speed during the disengagement of the clutch and the shifting of the gears, I connect the plunger 194 to the throttle valve 186 by a link 328 and an arm 329, which is mounted on the pivoted shaft 330 connected to the throttle valve. The throttle valve 186 is urged toward its open position by a spring 331, the force of the spring 331 being transmitted by suitable linkage to the throttle operating arm 329. This linkage includes an arm 332, which is pivotally supported at 333 and connected at the lower end at 334 to a link 335. The other end of the link 335 is pivotally connected at 336 to another link 337, which is pivotally connected to the end of the throttle operating arm 329. The spring 331 is connected at one end to the arm 332 at 334, and the other end of this spring is connected at 338 to an arm 339, which is pivotally supported at 340 and normally retained in the position illustrated in the drawing. By this arrangement, the spring 331 is inclined with respect to the link 335, so that it exerts a force tending to open the throttle 186 through the linkage above described. The throttle is controlled by a foot-operated plunger 341 connected at 342 to a bell-crank lever 343. This bell-crank lever is pivotally supported by a shaft 344, which is mounted in suitable bearings. The other end of the bell-crank lever 343 is provided with a pin 345, which extends into a slot 346 in the link 337. The plunger 341 is raised by a spring 347 and normally closes the throttle 186 against the action of the spring 331. When the plunger 341 is depressed against the action of the spring 347, the pin 345 moves toward the throttle operating arm 329 and the spring 331 causes the throttle valve 186 to open. This opening movement of the throttle 186 projects the plunger 194 in the valve 192 toward the position shown in the drawing, to close the valve 192 and cut off communication between the intake manifold 185 and the power device 189 and vent the power device through the slot 194a in the valve 192 so that the pressure in the power device rises and the clutch is gradually engaged. When the plunger 341 is released the spring 347 acts through this linkage to close the throttle valve 186, so that the engine operates at idling speed; and also to retract the plunger 194, so that the opening 197 therein is in alinement with the openings 196 and 195 in the valve and the vent through the slot 194a is closed. This opens communication between the intake manifold 185 and the power device 189, which lowers the pressure in the latter, and retracts the link 198 toward the power device to disengage the clutch.

The weights 278 move the cams 284 and 285 with respect to the first and second toggle switches to shift the gears of the speed changing mechanism in accordance with the speed of the vehicle. The action of the weights 278 is modified so that the gears will be shifted at different speeds, depending on the opening of the throttle 186 when the gear shifting operation is initiated, by providing a spring 347a arranged to oppose the axial movement of the sleeve 281, and the tension of this spring is increased in proportion to the opening of the engine throttle 186 produced by depression of the foot-actuated plunger 341. I accomplish this by providing an arm 348, which is mounted on the shaft 344 connected to one end of the tension spring 347a, and the other end of this spring is connected to an arm 349, which is pivotally supported at 350 and provided with a yoke 351 engaging a groove 352 in the sleeve 281. When the foot-operated plunger 341 is depressed it acts through the bell-crank lever 343, shaft 344 and the arm 348 to increase the tension of the spring 347a, which opposes the axial movement of the sleeve 281 produced by the weights 278 through the arm 349 and the yoke 351 engaging groove 352.

Whenever the gear shifting operation is initiated it is necessary to close the engine throttle and disengage the clutch connecting the engine to the speed changing mechanism. I provide a construction utilizing the spring 331 for this purpose, which includes an arm 353 rigidly connected to the arm 339 and pivotally supported at 340. The lower end of the arm 353 is provided with a latch 354 and a movable contact 310, which in the position illustrated in the drawing, bridges the contacts 309. The latch 354 thereon is engaged by a detent 355, which is pivotally supported at 356 and provided with an armature 357 arranged adjacent the throttle closing coil 300. Whenever the circuits are completed through the actuating coils of the electrically responsive gear shifting mechanism, the actuating coils cannot effect any movement of the stops as they are engaged by the arms 206 and 207, but the circuit is completed through the throttle closing coil 300, which attracts the armature 357 and releases the detent 355 from the latch 354. The spring 331 then swings the arm 353 away from the detent into the position shown in dotted lines in Fig. 2, which opens the contacts 309 and deenergizes the actuating coils. This movement of the arm 353 moves the spring 331 into the position shown in dotted lines in Fig. 2, so that it closes the throttle 186 and clutch. This linkage is free to move in this way to close the throttle and disengage the clutch, because the pin 345 is slidably arranged in the slot 346.

In order to return the arm 353 from the position shown in dotted lines in Fig. 2, to its position shown in full lines in Figs. 1 and 2 when the clutch is disengaged, I mount an arm 358 on the end of the shaft 200 having a roller 358a arranged in the path of movement of the arm 353, which is engaged by the arm 353 when the latch 354 is released, as shown in dotted lines in Fig. 2 of the drawing. This arm 358 is shown in Fig. 1 in its position when the clutch is engaged, so that when the arm 353 is released and swings into engagement with the roller 358a the throttle 186 is closed and the power device 189 is actuated to disengage the clutch. Upon movement of the link 198 to disengage the clutch, the arm 358 swings toward the detent 355, and after the clutch is disengaged moves arm 353, so that the detent 355 engages the latch 354, and the movable contact 310 will bridge the contacts 309 to complete the circuit to an actuating coil of the electrically responsive gear shifting mechanism. As the clutch is disengaged when the contacts 309 close in this way, the arms 206 and 207 will be swung away from the stops 227, 228, 249 and 250 respectively, so that the actuating coil can act on the rocking bar 234 or 256 to place the stops in the position to engage the desired gear of the speed changing mechanism. Restoring the arm 353 to the position shown in the drawing will cause the spring 331 to reopen the throttle 186 and close the valve 192 so as to operate the engine at the same throttle opening at which it was operated prior to the initiation of the gear shifting operation, and also engage the clutch. The opening of the throttle 186 in this way and reengaging the clutch will take place after the gears are shifted by the reciprocatory movement of the levers 206 and 207.

When it is desired to move the shifter bar 187 into its reverse position R the switch 302 is moved into engagement with a fixed contact 359. This energizes the actuating coil 248 from the battery 299 by a circuit including conductor 360, 361, contacts 241 and 243 of the double switch associated with the rocking bar 234, conductor 308 to the throttle closing coil 300, and contacts 309 to ground at 311, which completes the circuit to the battery 299, as one side thereof is grounded at 312. The other actuating coils of the gear shifting mechanism will be disconnected from the battery by moving the switch 302 into engagement with the contact 359, and the vehicle can be operated by engaging and disengaging the clutch by the foot-pedal 201, or by actuation of the foot-operated plunger 341. After the operation in reverse is completed, the switch 302 is moved out of engagement with the contact 359, and into a position to close the circuit to the toggle switches through conductor 303, and thereby restore automatic operation of the system.

The connection between the speed changing mechanism and the rear wheels includes an overrunning or "free-wheeling" clutch, which is controlled by the wire 362 connected to an operating button 363 arranged within convenient reach of the operator of the vehicle. Under some conditions it may be desirable to actuate the clutch by a foot pedal 201 and control the shifting of gears manually, for example, in using the engine to retard the vehicle in descending a grade. In using manual control it is necessary to disconnect the centrifugally actuated toggle switches from the battery, cut off communication between manifold 185 of the engine and the power device 189, and also lock the overrunning or free-wheeling clutch. I accomplish this by providing wires 364 and 365 connecting the operating button 363 with the switch 301 and plunger 193 respectively. By pulling upwardly on the button 363 the operator can simultaneously open the switch 301, lock the free-wheeling clutch and retract the plunger 193 to close the valve 192. The operator can then shift the gears as desired by actuating the switch arm 366, which is associated with fixed contacts 367, 368 and 369. The circuit between these fixed contacts and the actuating coils of the electrically controlled gear shifting mechanism is completed through contacts 370, 371 and 372, and the movable contacts 318, 305 and 326, which are interconnected by a bar 373, and which are brought into engagement with the contacts 370, 371 and 372 when manual control is desired. The circuit between the switch arm 366 and the battery required to energize the actuating coils of the gear shifting mechanism is completed by conductor 374. In resuming automatic operation of the system the arm 373 is depressed to the position shown in the drawing, which connects the toggle switches to the actuating coils of the gear shifting mechanism, and the button 363 is depressed to close the switch 301, release the overrunning clutch connected to the wire 362, and project the plunger 193 into the position shown in the drawing to place the clutch under the control of the plunger 194.

The operation of the power system will now be described. In the relation of the elements of the power system shown in Fig. 1 of the drawing, the vehicle is operating at slow speed with partially open throttle in first speed. As the vehicle increases in speed the weights 278 will move the cam 284 axially toward the end of the shaft 282 until it engages the arm 287, and moves the arm 294 of the toggle switch into engagement with the contact 313. This will complete a circuit between the battery 299, the actuating coil 270, and the throttle closing coil 300, so as to retract the armature 357, raise the detent 355, and release the arm 353. The arm 353 will then swing under the action of the spring 331 away from the detent 355 and into engagement with the roller 358a, as shown in dotted lines in Fig. 2 of the drawing. This movement of the arm 353 opens the contacts 309, and thereby deenergizes the throttle closing coil 300 and the actuating coil 270. The initial energization of the actuating coil 270 will not move the rocking bar 256, because the lever 207 is in engagement with the stops 249 and 250. The swinging of the arm 353 into engagement with the roller 358a wil cause the spring 331 to close the throttle valve 186 and open the valve 192 to disengage the clutch. Disengaging the clutch will swing the arms 206 and 207 against the action of the tension springs 217 and 220 away from the stops 227, 228, 249, and 250, and cause the arm 358 to swing the arm 353 into the position shown in Fig. 1 of the drawing in engagement with the detent 355. The movable contact 310 carried by the arm 353 will then bridge the contacts 309 and reclose the circuit through the throttle closing coil 300 and the actuating coil 270. As the arms 206 and 207 will then be out of engagement with the stops 227, 228, 249 and 250, the actuating coil 270 will swing the rocking bar 256, so that it projects the stop 250 and retracts the stop 249 out of the path of movement of the lever 207. The upper end of the rocking bar 256 will also engage the arm 273 carried by the interlocking bar 271 so as to bring the arms 276 and 276a into engagement with the rocking bar 234 and retain it in its mid-position with the stops 227 and 228 both in the path of movement of the lever 206. This movement of the rocking bar 256 will also engage it with the operating arm 268, thereby opening the contacts 263 and 265 and deenergizing the actuating coil 270 and the throttle closing coil 300. The detent 355 will then engage the latch 354 and retain the arm 353 in the position illustrated in the drawing. In this position of the arm 353 the spring 331 reopens the throttle valve 186 and closes the valve 192, so that the clutch will be engaged and the arm 358 restored to the position shown in the drawing. During this engagement of the clutch, the spring 217 will first cause the arm 206 to engage the stop 228 and move the shifter bar 187 from its first speed to its neutral position, and when the shifter bar reaches its neutral position the upper end of the arm 206 will engage the stop 227 to retain the shifter bar 187 in its neutral position. When the shifter bar 187 has reached its neutral position the lever 207 will engage the stop 250, and after the shifter bar 187 reaches its neutral position the lever 207 will swing past the stop 249, so as to move the shifter bar 188 into its second speed position 2. The above-described movements of the levers 206 and 207, to effect movement of the shifter bar 187 into its neutral position, and movement of the shifter bar 188 into its second speed position will take place before the reengagement of the clutch. The clutch will then reengage and the vehicle will operate in second speed.

Upon further increase in speed of the vehicle the cam 285 will pass the arm 321 and engage the arm 322, so as to move the arm 315 of the second toggle switch into engagement with the fixed contact 324. This completes a circuit between the battery 299 and the actuating coil 261 and the throttle closing coil 300, as the arm 294 of the first toggle switch will at this time be in engagement with the fixed contact 313. Upon completing this circuit the throttle closing coil 300 attracts the armature 357 and releases the arm 353, so that it swings into engagement with the roller 358a, as shown in dotted lines in Fig. 2 of the drawing, closing the throttle valve 186 and disengaging the clutch as previously described. The disengagement of the clutch will again swing the arms 206 and 207 away from the stops 227 and 228, 249 and 250, and restore the arm 353 to the position shown in Fig. 1 of the drawing, to close the contacts 309 and 310. Closing these contacts will reenergize the actuating coil 261 to project the stop 249 and retract the stop 250 out of the path of movement of the lever 207. The rocking bar 256 will, during this movement, act through the interlocking bar 271 to retain the rocking bar 234 in its mid-position in which both of the stops 227 and 228 are in the path of movement of the lever 206. In moving under the action of the actuating coil 261 the rocking bar 256 will also engage the operating arm 267 to open the contacts 262 and 264, and deenergize the actuating coil and the throttle closing coil 300. This will cause the detent 355 to engage the latch 354 and retain the lever 353 in the position illustrated in the drawing, and the throttle valve 186 will be opened and the valve 192 closed to engage the clutch. During movement of the lever to engage the clutch, the arm 206 will be acted upon by the spring 217 to engage the stops 227 and 228 and retain the shifter bar 187 in its neutral position, and the spring 220 will act on the lever 207 to engage the stop 249 and swing the lever 207 past the end of the stop 250, thereby moving the shifter bar 188 into its third speed position 3. After these levers 206 and 207 have been actuated in this way the clutch will engage and the vehicle can be operated in third speed.

If the vehicle is slowed down as in ascending a steep grade, the weights 278 will act upon the cams 284 and 285 to successively actuate the toggle switches to shift the gears into second speed, or first speed, as required, in the manner above described. Moreover, the gears will be shifted automatically as required by the operating conditions.

When the vehicle is stopped the cam 284 will engage the arm 286 of the first toggle switch and complete the circuits to the electrically controlled gear shifting mechanism to move the shifter bar 187 into its first speed position 1. The foot-operated plunger 341 will then be released and the valve 192 opened, so as to disengage the clutch, but if the engine is stopped the pressure will gradually rise in the power device 189 and engage the clutch. The engine cannot then be started without immediately transmitting power to the wheels. I therefore provide a lever 375 for moving the shifter bars 187 and 188 to their neutral position when the vehicle is stopped. The lever is pivotally supported at 376, and has a transverse pin 377 at the lower end thereof extending into slots 378 and 379 formed in the ends of the shifter bars. The lever 375 does not interfere with the shifting of the gears automatically but either of the shifter bars can be moved to its neutral position by moving the lever 375 until the pin 377 engages the end of the slot in one of the shifter bars, and moving the lever further until the pin engages the end of the slot in the other shifter bar, which will be in its neutral position.

Although I have shown particular embodiments of my improved power system as applied to a vehicle, I do not desire my invention to be limited to the particular arrangements disclosed, and I intend in the appended claims to cover all modifications which do not depart from the spirit and scope of my invention.

What I claim as new and desire to secure by Letters Patent of the United States, is:

1. A gear shifting mechanism including a lever operable to a neutral and to a gear engaging position, means for reciprocating said lever, means including retractable means in the path of movement of said lever about which said lever is pivoted for moving said lever from one of said positions to another.

2. A gear shifting mechanism including a lever operable to a neutral and to a gear engaging position, means engaging said lever intermediate the ends thereof for reciprocating said lever, and selectively retractable means arranged on opposite sides of said reciprocating means and interposed in the path of movement of said lever for controlling the operation of said lever to one of said positions.

3. A gear shifting mechanism including a shifter bar movable to a neutral and to a gear engaging position, a lever pivotally secured to said shifter bar, said lever having a pivotal connection intermediate the ends thereof, means for reciprocating said pivotal connection, and retractable means arranged on opposite sides of said pivotal connection and interposed in the path of movement of said lever for controlling the movement of said shifter bar from one position to another.

4. A gear shifting mechanism including a shifter bar movable to a neutral and to a gear engaging position, a lever pivotally secured to said shifter bar, said lever having a pivotal connection intermediate the ends thereof, means for reciprocating said pivotal connection, stops arranged on opposite sides of said pivotal connection in the path of movement of said lever, and means interconnecting said stops for retracting one of them out of the path of movement of said lever and advancing the other with respect to the path of movement of said lever so as to control the movement of said shifter bar from one position to another.

5. A gear shifting mechanism including a plurality of shifter bars each movable to a neutral and to a gear engaging position, levers pivotally secured to each of said shifter bars, each of said levers having a pivotal connection intermediate the ends thereof, means for reciprocating said pivotal connections, each of said levers having stops arranged on opposite sides of its pivotal connection and in the path of movement of said lever, and means interconnecting said stops and associated with each of said levers for retracting one of said stops out of the path of movement of said lever and advancing the other with respect to the path of movement of said lever, said stops being arranged in such relation to the path of movement of said levers as to control the movement of one of said shifter bars to a neutral position before the other shifter bar is moved to a gear engaging position.

6. A gear shifting mechanism including a plurality of shifter bars each movable to a neutral and to a gear engaging position, levers secured to each of said shifter bars, each of said levers having a pivotal connection intermediate the ends thereof, means for reciprocating said pivotal connections, each of said levers having stops arranged on opposite sides of its pivotal connection and in the path of movement of said lever, and means interconnecting said stops and associated with each of said levers for retracting one of said stops out of the path of movement of said lever and for advancing the other with respect to the path of movement of said lever, said stops being arranged in such relation to the path of movement of said levers as to control the movement of one of said shifter bars to a neutral position before another shifter bar is moved to a gear engaging position, and means for interlocking said stops to prevent movement of all except one of said shifter bars to a gear engaging position.

7. A power system including a prime mover, a driven member, a clutch and a gear shifting mechanism including a lever operable to a neutral and to a gear engaging position for connecting said driven member to said prime mover, a pivotal connection on said lever, means for disengaging and engaging said clutch and coincidently providing for reciprocating said pivotal connection, means including retractable stops in the path of movement of said lever for controlling the operation of said lever from said one position to another position.

8. A power system including a prime mover, a driven member, a clutch and a gear shifting mechanism including a shifter bar movable to a neutral and to a gear engaging position for connecting said driven member to said prime mover, a lever pivotally secured to said shifter bar, said lever having a pivotal connection intermediate the ends thereof, means for disengaging and engaging said clutch and coincidently providing for reciprocating said pivotal connection, and retractable means arranged on opposite sides of said pivotal connection and interposed in the path of movement of said lever for controlling the movement of said shifter bar from one position to another.

9. A power system including a prime mover, a driven member, a clutch and a gear shifting mechanism including a plurality of shifter bars each movable to a neutral and to a gear engaging position for connecting said driven member to said prime mover, levers pivotally secured to each of said shifter bars, each of said levers having a pivotal connection intermediate the ends thereof, means for disengaging and engaging said clutch and coincidently providing for reciprocating said pivotal connections, each of said levers having stops arranged on opposite sides of its pivotal connection and in the path of movement of said lever, and means interconnecting said stops and associated with each of said levers for retracting one of said stops out of the path of movement of said lever and advancing the other with respect to the path of movement of said lever, said stops being arranged in such relation to the path of movement of said levers as to control the movement of one of said shifter bars to a neutral position before the other shifter bar is moved to a gear engaging position.

10. A power system including a prime mover, means for controlling the torque of said prime mover, a driven member, a clutch and a gear shifting mechanism including a lever operable to a neutral and to a gear engaging position for connecting said driven member to said prime mover, means for biasing said lever toward one of its positions, means controlled by said torque controlling means for disengaging and engaging said clutch and coincidently providing for actuating said lever against said biasing means and releasing said lever, and means responsive to actuation and release of said lever for shifting the gears of said gear shifting mechanism.

11. A power system including a prime mover, means for controlling the torque of said prime mover, a driven member, a clutch and a gear shifting mechanism including a lever operable to a neutral and to a gear engaging position for connecting said driven member to said prime mover, means controlled by said torque controlling means for actuating said clutch to disengage and engage the same, means for moving said lever in response to the disengagement and engagement of said clutch, and means utilizing the movement of said lever for shifting the gears of said gear shifting mechanism.

12. A gear shifting mechanism including a plurality of levers each movable to a neutral and to a gear-engaging position, each of said levers having a pivotal connection intermediate ends thereof, means for reciprocating said pivotal connections, each of said levers having stops arranged on opposite sides of its pivotal connection and in the path of movement of said levers, means interconnecting said stops and associated with each of said levers for retracting one of said stops out of the path of movement of one of said levers and advancing the other of said stops with respect to the path of movement of said one of said levers, said stops being arranged in such relation to the path of movement of said levers as to control the movement of said levers to a neutral position before any lever is moved to a gear-engaging position, and means including electromagnets associated with each of said means interconnecting said stops for actuating said stops.

13. A gear shifting mechanism including a plurality of levers each movable to a neutral and to a gear-engaging position, each of said levers having a pivotal connection intermediate the ends thereof, means for reciprocating said pivotal connections, each of said levers having stops arranged on opposite sides of its pivotal connection and in the path of movement of said lever, and means interconnecting said stops and associated with each of said levers for retracting one of said stops out of the path of movement of said lever and advancing the other with respect to the path of movement of said lever, said stops being arranged in such relation to the path of movement of said levers as to control the movement of one of said levers to a neutral position before any other of said levers is moved to a gear-engaging position, means for interlocking said stops to prevent movement of all except one of said levers to a gear-engaging position, and means including electromagnets associated with said means interconnecting said stops for actuating said stops.

14. A power system including a prime mover, means for controlling the torque exerted by said prime mover, a driven member, a clutch and a gear shifting mechanism including a lever operable from a neutral to a gear-engaging position for connecting said driven member to said prime mover, means for biasing said lever toward one of its positions, means for actuating said clutch to disengage and engage the same, means including a lost motion connection between said clutch actuating means and said lever for reciprocating said lever in response to disengaging and engaging said clutch, and means utilizing the reciprocatory movement of said lever for shifting the gears of said gear-shifting mechanism, said last mentioned means being controlled by said driven member and said torque controlling means.

15. A gear shifting mechanism including a lever operable to a neutral and to a gear engaging position, a pivotal connection on said lever, means for reciprocating said pivotal connection, means including retractable stops in the path of movement of said lever for controlling the operation of said lever from said one position to another of said positions.

16. A gear shifting mechanism including a lever operable to a neutral and to a gear engaging position, a pivotal connection on said lever intermediate the ends thereof, means for reciprocating said pivotal connection, and retractable means arranged on opposite sides of said pivotal connection and interposed in the path of movement of said lever for controlling the operation of said lever from one position to another.

17. A gear shifting mechanism including a lever operable to a neutral and to a gear engaging position, means for reciprocating said lever, retractable means arranged on opposite sides of said reciprocating means and interposed in the path of movement of the lever for controlling the operation of said lever to one of said positions, means interconnecting said retractable means for selectively actuating said retractable means, electrically responsive means for actuating said interconnecting means, and means operable by said interconnecting means for deenergizing said electrically responsive means.

18. A gear shifting mechanism including a plurality of levers each movable to a neutral and to a gear engaging position, each of said levers having a pivotal connection intermediate the ends thereof, means for reciprocating said pivotal connections, each of said levers having stops arranged on opposite sides of its pivotal connection and in the path of movement of said lever, means interconnecting said stops and associated with each of said levers for retracting one of said stops out of the path of movement of one of said levers and advancing the other of said stops with respect to the path of movement of said one of said levers, said stops being arranged in such relation to the path of movement of said levers as to control the movement of said levers to a neutral position, before any lever is moved to a gear engaging position, means including electro-magnets associated with each of said means interconnecting said stops for actuating said stops, and means operable by said stop interconnecting means for deenergizing said electro-magnetic means.

19. A power system including a prime mover, means for controlling the torque of said prime mover, a driven member, a clutch and a gear shifting mechanism including a lever operable to a neutral and to a gear engaging position for connecting said driven member to said prime mover, means for biasing said lever toward one of its positions, means controlled by said torque controlling means for actuating said clutch to disengage and engage the same, means including a lost motion connection between said clutch actuating means and said lever for reciprocating said lever in response to disengagement and engagement of said clutch, and means actuated by the reciprocatory movement of said lever for changing the ratio of said gear shifting mechanism.

20. A power system including a prime mover, a driven member, a clutch and a gear shifting mechanism including a shifter bar movable to a neutral and to a gear engaging position for connecting said driven member to said prime mover, a lever pivotally secured to said shifter bar and having a pivotal connection intermediate the ends thereof, means for disengaging and engaging said clutch and coincidentally providing for reciprocating said pivotal connection, retractable means arranged on opposite sides of said pivotal connection and interposed in the path of movement of said lever for controlling the movement of said shifter bar from one position to another, electrically responsive means for selectively actuating said retractable means, and means operable by said electrically responsive means for deenergizing said electrically responsive means.

21. A power system including a prime mover, a driven member, a clutch and a gear shifting mechanism including a lever operable to a neutral and to a gear engaging position for connecting said driven member to said prime mover, means for biasing said lever toward one of its positions, means controlled by said driven member for controlling the disengagement and engagement of said clutch and coincidentally providing for actuating said lever against said biasing means and releasing said lever, means responsive to actuation and release of said lever for shifting the gears of said gear shifting mechanism, and manually operable means for rendering ineffective said driven member control means and for manually controlling the operation of said gear shifting mechanism.

22. A gear shifting mechanism including a lever having a pivotal connection intermediate the ends thereof, means for reciprocating said pivotal connection, stops arranged on opposite sides of said pivotal connection in the path of movement of said lever, means interconnecting said stops for retracting one of them out of the path of movement of said lever and advancing the other with respect to the path of movement of said lever so as to control the movement of said lever from one position to another, and electrically responsive means associated with said interconnection of said stops for actuating said stops.

DAVID C. PRINCE.